Aug. 31, 1926.
H. GOTTSCHALK
FEEDING DEVICE FOR SUBMERGED ARTICLES
Filed August 12, 1925
1,598,435
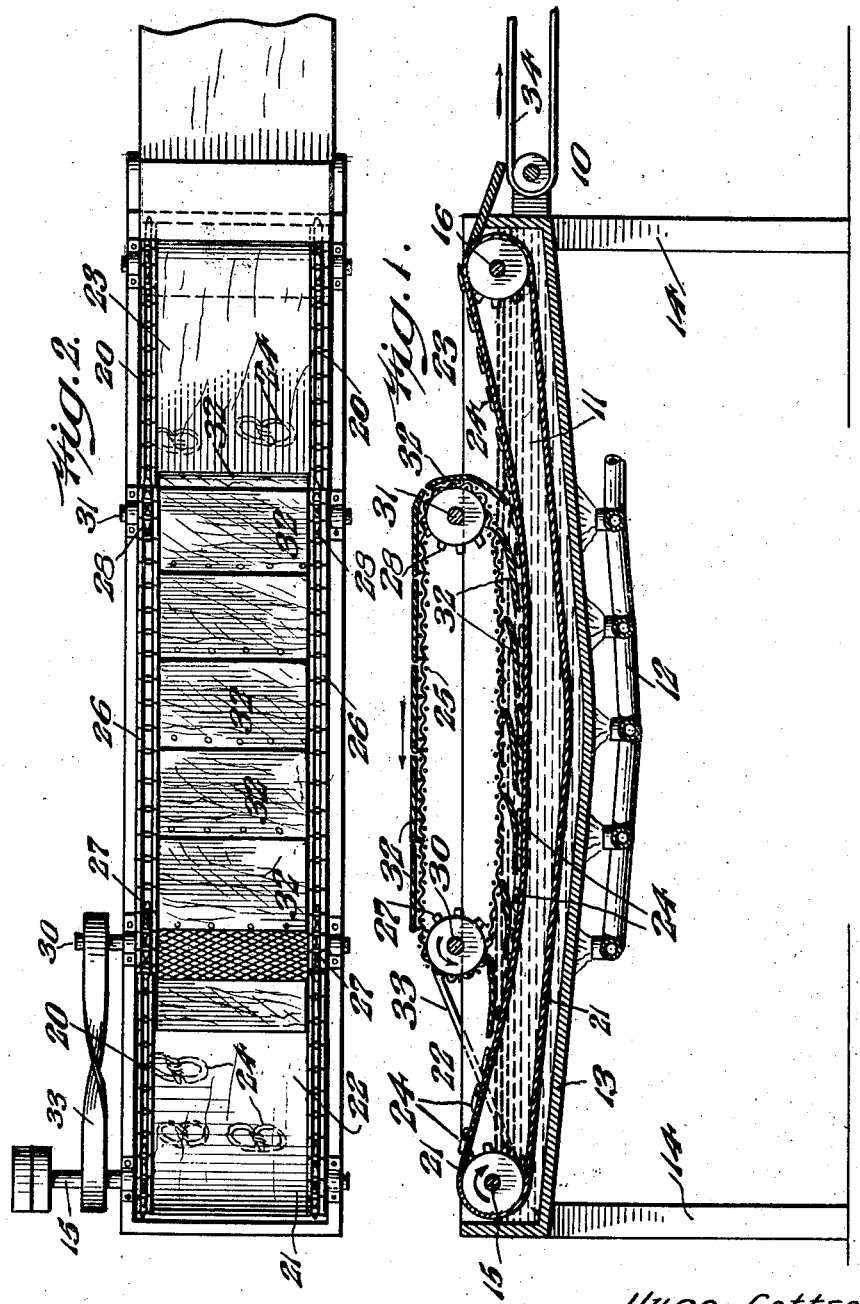
Inventor
Hugo Gottschalk,
By Robert M. Ban
Attorney Patented Aug. 31, 1926.

1,598,435

UNITED STATES PATENT OFFICE.

HUGO GOTTSCHALK, OF REEDSVILLE, PENNSYLVANIA.

FEEDING DEVICE FOR SUBMERGED ARTICLES.

Application filed August 12, 1925. Serial No. 49,710.

The present invention relates to machines for feeding articles through a body of liquid, and more particularly to the feeding of formed dough through a liquid cooking medium in the process of making pretzels.

Some of the objects of the present invention are to provide an improved means for feeding dough forms or other articles through a liquid treating or heating bath; to provide means for maintaining dough forms or articles submerged while being fed through a liquid treating or heating bath; to provide an improved means for feeding formed pretzel dough in the automatic making of pretzels; to provide means for maintaining the arrangement and relation of a plurality of pretzel dough forms while passing through a cooking liquid; to provide means for conserving heat units in the initial cooking of pretzels; and to provide other improvements as will hereinafter appear.

In the accompanying drawings, Fig. 1 represents a longitudinal section of a cooking machine embodying one form of the present invention; and Fig. 2 represents a plan of the same.

Referring to the drawings, one form of the present invention comprises a machine or "cooker" 10 of the type employing a bath 11 which is heated by burners 12 or any other means suitable for the purpose, and through which the articles to be treated, steamed or cooked are to be fed. In the present instance the bath 11 is contained in a trough or tank 13 suspended between standards 14 so that the bottom thereof is in close proximity to the burners 12 and within the maximum heat zone in order to maintain the bath 11 at the desired cooking temperature.

For the purpose of feeding and conveying the articles, such as pieces of dough, to and through the bath 11, the standards 14, or the machine frame if desired, provide journal bearings for shafts 15 and 16 which respectively carry sprockets 17 and 18 for driving the sprocket chains 20 of a conveyor 21, supported at its sides by the aforesaid chains 20. The arrangement is such that the conveyor 20 travels for the major portion of its length submerged in the bath or heating liquid 11, thus providing a receiving area 22 and a delivering area 23 above the surface of the bath 11.

In order to prevent the articles 24, such for example as formed pretzel dough, from floating off of the conveyor 21 when the latter enters the heated liquid, a traveling continuous apron 25 is provided, preferably formed of wire mesh having its side edges attached respectively to sprocket chains 26 which are carried by sprockets 27 and 28 keyed respectively to a driven shaft 30 and an end shaft 31. The apron 25 is provided upon its outer face with a plurality of flap or holder members 32 each attached at one end to the apron 25 so that when the members 32 are brought to the under side of the apron 25 each will fall by gravity towards and against the articles on the upper face of the conveyor 21 to prevent them from becoming displaced or floating free.

Preferably the holder members 32 are made of cloth, though any suitable material may be employed, and while each member as here shown is substantially of the same width as the apron 25, this is not a limitation of the invention, as obviously several members 32 might be arranged side by side or in various other ways and still carry out the desired function of assuming a position over the articles on the conveyor 21. The length of members 32 is preferably such that their ends are substantially in abutting relation when they lie upon the upper face of the apron 25, and when so located the apron forms a cover for the exposed surface of the bath 11 and in that way acts to retain the heat and prevents the loss of heat to the relatively cool outside air. While the length of the apron 25 is substantially that of the exposed bath surface, there is no loss of heat at the receiving and delivery ends of the tank because these end portions are covered respectively by the ends of the conveyor 21.

The conveyor 21 is driven from any suitable source of power and travels in the direction indicated by the arrows, Fig. 1, while the apron 25 travels in the opposite direction and may be driven from the shaft 30 by a crossed belt 33 or any other suitable means.

In operation the formed dough pieces, or other articles to be cooked or treated by contact with a heated bath, are placed upon the receiving end of the conveyor 21 and are carried by it into and through the bath or heated liquid in submerged relation. At the time a row of the pieces reaches the contact line of the conveyor 21 with the liquid, the apron 25 brings one of its holder members 32 to the point where it automatically folds over to drop in flat condition upon the pieces and then travel in submerged relation covering the pieces and holding them in arranged relation upon the conveyor 21 during its travel through the bath. The speed of the conveyor 21 and the apron 25 is the same and consequently the members 32 function as covers which are superposed upon the pieces or articles as they pass through the liquid. When the conveyor 21 leaves the liquid at the delivery end the members 32 are automatically lifted off by the apron 25 and take a position one behind the other along the upper face of the apron. The cooked or heated pieces or articles are then delivered to a carrier belt 34 or a receptacle according to the nature of the machine. In the present instance the machine is used for cooking pretzels, which is the step prior to salting, and hence as the pretzels leave the conveyor 21 they are deposited upon the belt 34 for salting and for feeding them to the baking oven.

It will now be apparent that a complete unitary feeding device for formed pretzel dough or other articles to be passed through a heating or treating liquid has been devised, wherein the dough or other articles capable of floating in the liquid will be held in place during their passage through the liquid and the relative arrangement be maintained at the same time.

While the machine as shown and described has particular reference to the initial cooking of pretzels, the invention is not limited to this specific purpose but applies to the feeding of any other floatable articles which are to be fed through a body of liquid.

Having thus described my invention, I claim:

1. In a machine of the character stated, a tank, a liquid in said tank, a conveyor having a portion of its conveyor surface submerged in said liquid, and means including a plurality of depending cover members hinged at one edge only and coacting with articles on said conveyor to prevent displacement of said articles when moving through said liquid.

2. In a machine of the character stated, a tank, a liquid in said tank, a conveyor having a portion of its conveying surface submerged in said liquid, a traveling apron arranged above the submerged portion of said conveyor, and means attached to said apron at one edge only for holding articles on said conveyor during submerged feeding.

3. In a machine of the character stated, a tank, a liquid in said tank, a conveyor having a portion of its conveying surface submerged in said liquid, a traveling apron arranged above the submerged portion of said conveyor, and a plurality of members attached respectively at one edge only to said apron and resting respectively upon rows of articles on said conveyor during submerged feeding.

4. In a machine of the character stated, a tank, a liquid in said tank, a conveyor arranged to convey transversely arranged rows of pretzels through said liquid, a traveling apron arranged above said conveyor, a plurality of flaps secured along one edge to said apron for respectively resting upon the transverse rows of pretzels, and means for simultaneously driving said apron and said conveyor.

Signed at Philadelphia, in the county of Philadelphia, and State of Pennsylvania, this 4th day of August, 1925.

HUGO GOTTSCHALK.